(12) United States Patent
Lattanzio et al.

(10) Patent No.: US 9,617,860 B2
(45) Date of Patent: Apr. 11, 2017

(54) FAN BLADES FOR GAS TURBINE ENGINES WITH REDUCED STRESS CONCENTRATION AT LEADING EDGE

(71) Applicant: UNITED TECHNOLOGIES CORPORATION, Farmington, CT (US)

(72) Inventors: Santiago Lattanzio, Manchester, CT (US); Olaleye M. Amoo, Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1061 days.

(21) Appl. No.: 13/721,650

(22) Filed: Dec. 20, 2012

(65) Prior Publication Data

US 2014/0271178 A1    Sep. 18, 2014

(51) Int. Cl.
*F01D 5/14*    (2006.01)
*F01D 5/30*    (2006.01)

(52) U.S. Cl.
CPC ........... *F01D 5/3007* (2013.01); *F01D 5/141* (2013.01); *F01D 5/147* (2013.01); *F05D 2220/36* (2013.01); *Y02T 50/671* (2013.01); *Y02T 50/673* (2013.01)

(58) Field of Classification Search
CPC ...... F01D 5/3007; F01D 5/3015; F01D 5/147; F01D 5/141; F05D 2220/36; F04D 29/324
See application file for complete search history.

(56) References Cited

U.S. PATENT DOCUMENTS

| | | | |
|---|---|---|---|
| 4,453,890 A * | 6/1984 | Brantley | ............... F01D 5/3007 416/193 A |
| 5,141,400 A | 8/1992 | Murphy et al. | |
| 5,655,883 A | 8/1997 | Schilling | |
| 6,004,101 A | 12/1999 | Schilling et al. | |

(Continued)

FOREIGN PATENT DOCUMENTS

| | | |
|---|---|---|
| DE | 102011102359 A1 | 11/2012 |
| EP | 2353830 A2 | 8/2011 |
| WO | 2012008452 A1 | 1/2012 |

OTHER PUBLICATIONS

International Preliminary Report on Patentability for International application No. PCT/US2013/72987 dated Jun. 23, 2015.

(Continued)

*Primary Examiner* — Richard Edgar
*Assistant Examiner* — Jesse Prager
(74) *Attorney, Agent, or Firm* — Cantor Colburn LLP

(57) ABSTRACT

A light weight fan blade for a gas turbine engine is disclosed. The disclosed fan blade has an increased chord length at a transition section between the inner edge or single tooth attachment portion of the fan blade that connects to the rotor disk and the airfoil. Increasing the chord length at the transition section substantially reduces the stress concentration when the fan blade is operated under normal operating conditions. Reducing the stress concentration enables engineers to design lighter fan blades and larger fan blades for larger gas turbine engines. By increasing the size of gas turbine engines, additional thrust can be provided without adding additional engines to the aircraft.

12 Claims, 5 Drawing Sheets

(56) References Cited

U.S. PATENT DOCUMENTS

| | | | |
|---|---|---|---|
| 6,769,877 B2* | 8/2004 | Martin | F01D 5/147 |
| | | | 29/889.21 |
| 6,976,826 B2 | 12/2005 | Roy et al. | |
| 6,991,428 B2 | 1/2006 | Crane | |
| 7,083,388 B2* | 8/2006 | Parisi | B23P 15/04 |
| | | | 29/889.7 |
| 7,153,102 B2 | 12/2006 | Stone | |
| 7,156,621 B2 | 1/2007 | Stone | |
| 7,204,676 B2 | 4/2007 | Dutton et al. | |
| 7,955,054 B2 | 6/2011 | El-Aini et al. | |
| 8,066,479 B2 | 11/2011 | El-Aini et al. | |
| 2004/0076521 A1 | 4/2004 | Martin et al. | |
| 2005/0084380 A1 | 4/2005 | Fett et al. | |
| 2007/0031259 A1 | 2/2007 | Dube et al. | |
| 2011/0182740 A1 | 7/2011 | Klinetob et al. | |
| 2011/0211965 A1* | 9/2011 | Deal | F01D 5/147 |
| | | | 416/223 R |
| 2011/0229334 A1* | 9/2011 | Alexander | F01D 5/282 |
| | | | 416/224 |
| 2012/0003100 A1 | 1/2012 | James et al. | |
| 2013/0064669 A1 | 3/2013 | Kray et al. | |
| 2013/0111908 A1* | 5/2013 | Murooka | F01D 5/28 |
| | | | 60/726 |
| 2013/0323065 A1* | 12/2013 | Murooka | F01D 5/141 |
| | | | 416/219 R |

OTHER PUBLICATIONS

International Search Report for International application No. PCT/US13/72987 dated Oct. 30, 2014.
Written Opinion for International application No. PCT/US13/72987 dated Oct. 30, 2014.
English Abstract for DE102011102359A1—Nov. 29, 2012; 2 pgs.
English Abstract for WO2012008452A1—Jan. 19, 2012; 2pgs.
EP search Report for Application No. 13876443.6-1610/2935796 PCT/US2013072987; Dated: Nov. 25, 2015; 10 pgs.

* cited by examiner

FAN BLADES FOR GAS TURBINE ENGINES WITH REDUCED STRESS CONCENTRATION AT LEADING EDGE

TECHNICAL FIELD

This disclosure is directed toward fan blades for gas turbine engines and, more specifically, to fan blade designs that reduce stress concentrations at the leading edges of the blades.

BACKGROUND OF THE DISCLOSURE

Aircraft and aircraft engine design have always strived for reduced weight and greater efficiency. Other factors affecting aircraft and engine design involve cost and size, including the maintenance of the aircraft and the engines. With increased emphasis in these areas, future aircraft are growing in size, requiring either more thrust from the engines or additional engines. Reduced maintenance costs and initial costs can be achieved by enlarging the engines and increasing the thrust provided by the engines rather than by increasing the number of engines. However, as the engines grow larger, weight reduction becomes paramount as larger engines require larger, and therefore, heavier components.

Thus, the next generation of commercial high thrust gas turbine engines will have large fan diameters. The increased fan diameters will require longer blades. The longer blades will have wider chords for increased efficiency. The chord, which is an axial straight line dimension between a trailing edge and a leading edge of a fan blade, will grow with the increased blade size. The wider chord blades offer the increased efficiency because they have greater stability margins and move the air more efficiently across the blade face due to their longer chords. Increased blade efficiency is important in high bypass turbine engines because a significant amount of the air flow generated by the fan blades bypasses the compressors, combustor and turbines and is used to provide direct thrust.

Thus, engine propulsion thrust is typically increased by increasing the diameter of the fan blade/rotor assembly, which also necessarily increases the weight and stress on the fan blades during operation. Accordingly, larger fan blades require correspondingly high strength materials in order to counteract the various aerodynamic and centrifugal stresses generated during operation and for ensuring a suitable useful life span of the larger fan blades.

A typical fan blade includes an airfoil and an integral single tooth attachment root which permits individual assembly and disassembly of the blades in corresponding single tooth attachment slots in a fan rotor disk. The blade dovetail must therefore have sufficient strength for transferring the significant centrifugal loads from the rotating fan blades into the perimeter of the rotor disk within acceptable stress limits. The size and configuration of the airfoil is determined by the specific aerodynamic requirements of the fan and is limited by the availability of suitable high strength materials capable of withstanding the various stresses or stress concentrations experienced during operation of the fan. One problematic area of a fan blade is the stress concentration experienced at the leading edge of the fan blade radially outside of the single tooth attachment.

Titanium is a common high strength material used in fan blades, but is undesirably expensive. A solid titanium fan blade can be readily manufactured, yet has a correspondingly high weight which adds to the centrifugal loads generated during operation. Hollow titanium fan blades are also known for reducing weight while maintaining strength, but increase the complexity of blade manufacture and associated costs. Thus, a hollow titanium blade has minimum weight with suitable high strength yet is very expensive to manufacture. Another form of a titanium fan blade is the hybrid fan blade which is primarily solid titanium with weight reducing pockets formed therein which may be filled with a lightweight, nonstructural filler material to complete the aerodynamic profile of the blade. The hybrid titanium blade is less expensive to manufacture than hollow titanium blades yet does not provide the greater weight reductions of the hollow titanium blade. Hence design methods and/or alternate materials may be a key to weight reduction, while reducing costs.

Further, there is a need to provide such lightweight materials with sufficient strength for transferring the stress concentrations from the rotating fan blades to the perimeter of the rotor disk within acceptable stress limits. More specifically, high stress concentrations at the leading edge of the fan blade radially outside of the single tooth attachment need to be addressed.

SUMMARY OF THE DISCLOSURE

In one aspect, a fan blade is disclosed. The disclosed fan blade may include an airfoil that may be connected to a single tooth attachment at a transition section. The airfoil, transition section and single tooth attachment may each include leading and trailing edges. The airfoil and transition section may define a first chord at a junction of the airfoil and transition section. The transition section and single tooth attachment may define a second chord at a junction of the transition section and single tooth attachment. The leading and trailing edges of the single tooth attachment define a length. The second chord is at least as long as the length of the single tooth attachment and the first chord is longer than the second chord.

In another aspect, a gas turbine engine is disclosed. The disclosed engine may include a fan blade assembly that may include a rotor disk having an outer periphery. The outer periphery of the rotor disk may include a plurality of single tooth attachment slots. The engine may also include a plurality of fan blades. Each fan blade may include an airfoil connected to a dovetail at a transition section. Each single tooth attachment slot of the rotor disk may accommodate one of the single tooth attachments of one of the fan blades. For each fan blade, the airfoil, transition section and single tooth attachment may include leading and trailing edges. For each fan blade, the transition section may define a first chord at a junction of said transition section and its airfoil. For each fan blade, the transition section may define a second chord at a junction of said transition section and its single tooth attachment. Finally, for each fan blade, the leading and trailing edges of the single tooth attachment may define a length. For each fan blade, the second chord may be at least as long as the length of its single tooth attachment and for each fan blade, the first chord may be longer than the second chord.

A method for reducing a stress concentration of a fan blade of a gas turbine engine is also disclosed. The disclosed method may include providing a fan blade as described above and extending the transition section of the fan blade axially away from the single tooth attachment of the fan blade or making the transition section wider as the transition section extends from the junction of the transition section and the single tooth attachment to the junction of the transition section and the airfoil.

In any one or more of the embodiments described above, the leading edge of the transition section may extend axially outward from the junction of the transition section and the single tooth attachment before reaching the junction of the transition section and the airfoil. In other words, the transition section becomes wider as it extends from the single tooth attachment to the airfoil.

For any one or more of the embodiments described above, the trailing edges of the airfoil, transition section and single tooth attachment may be at least substantially coplanar.

For any one or more of the embodiments described above, the airfoil is at least substantially covered by a sheath. In such an embodiment, the sheath may cover the airfoil but not the transition section. In such an embodiment, the sheath may be fabricated from a material selected from the group consisting of titanium or a titanium alloy.

In any one or more of the embodiments described above, the leading edge of the transition section curves as the leading edge of the transition section extends from the junction of the transition section and the single tooth attachment to the junction of the transition section and the airfoil.

In any one or more of the embodiments described above, the junction of the transition section and the airfoil may have a first thickness and the junction of the transition section in the single tooth attachment may have a second thickness. Further, the second thickness may be greater than the first thickness.

DETAILED DESCRIPTION

Figure 1:
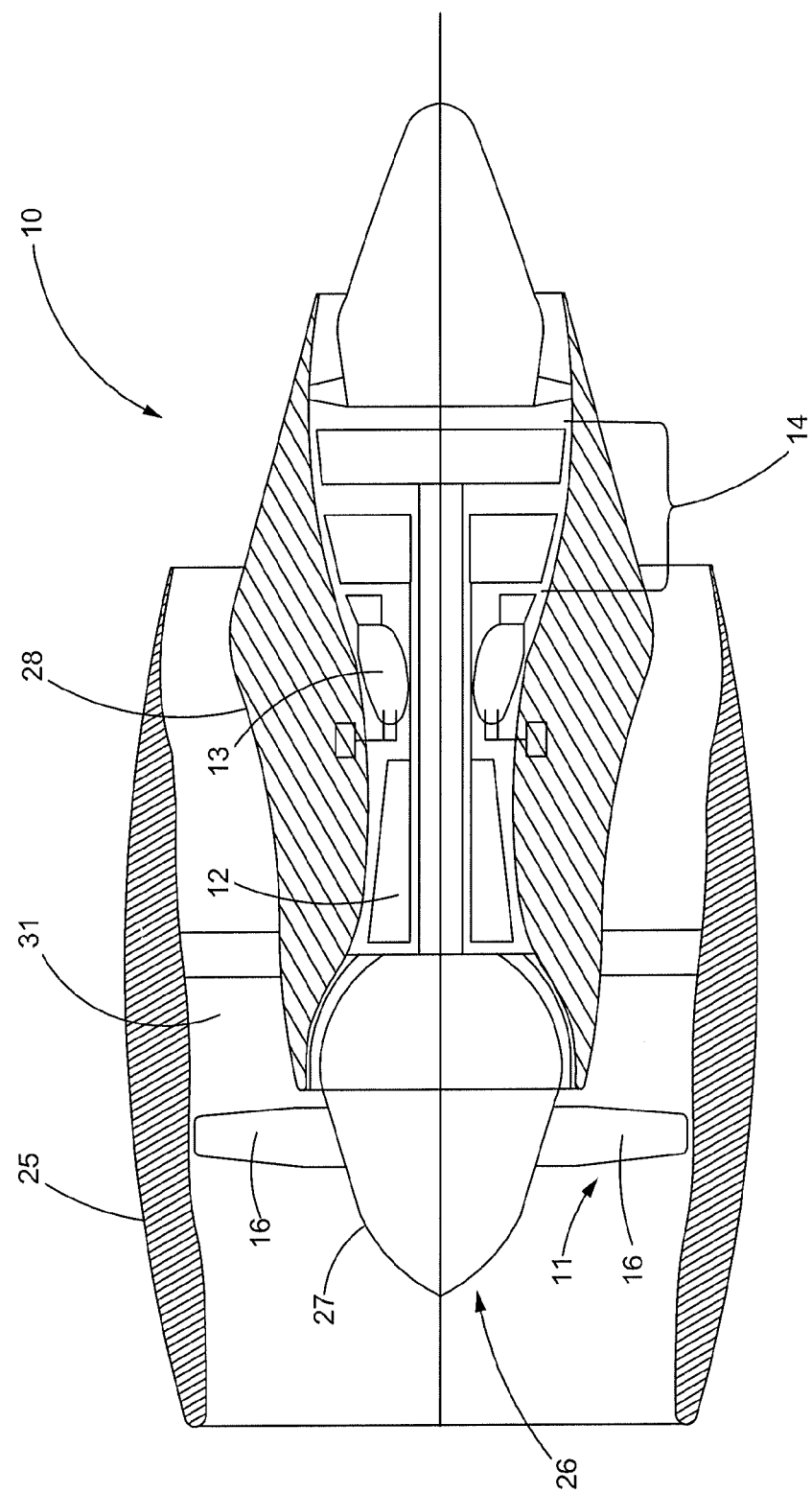
FIG. 1 is a sectional view of a gas turbine engine in which the improvements provided by this disclosure may be incorporated.

FIG. 1 illustrates a gas turbine engine 10 generally including a fan 11 through which ambient air is propelled, a compressor section 12 for pressurizing the air, a combustor 13 in which the compressed air is mixed with fuel and ignited for generating an annular stream of hot combustion gases, and a turbine section 14 for extracting energy from the combustion gases.

Figure 2:
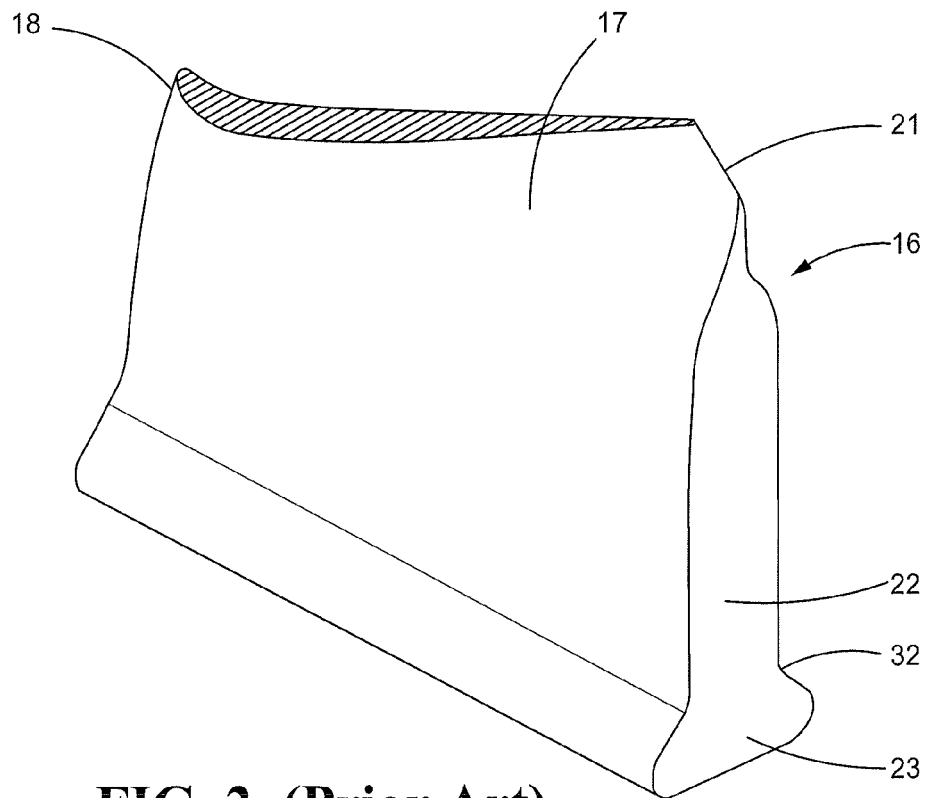
FIG. 2 is a partial sectional view of the inner end or single tooth attachment and root of a conventional fan blade.
Figure 3:
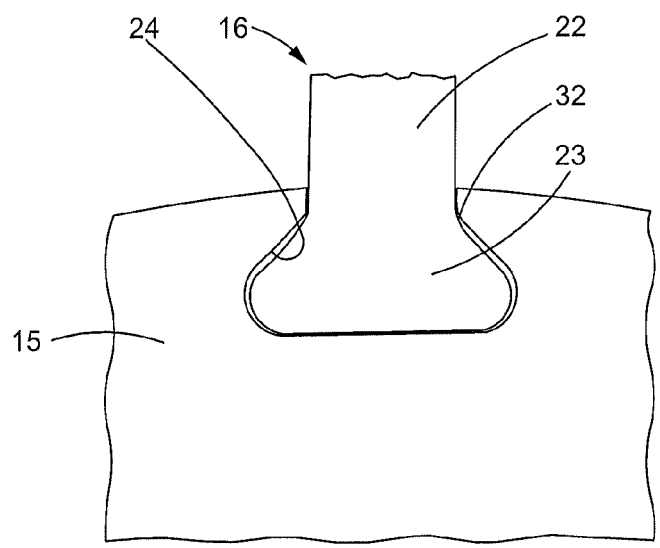
FIG. 3 illustrates the coupling of a fan blade with a single tooth attachment inner end such as that shown in FIG. 2 as it is accommodated in a single tooth attachment groove disposed in a rotor disk.

Referring to FIGS. 2-3, the fan 11 includes a rotor disk 15 supporting a plurality of the blades 16 which are asymmetric with respect to their radial axis. Each blade 16 includes an airfoil portion 17 including a leading edge 18 and a trailing edge 21. The airfoil portion 17 extends radially outwardly from a blade root 22, which includes an axially extending single tooth attachment (23, which is designed to engage a corresponding single tooth attachment groove 24 in the rotor disk 15 (FIG. 3). The airfoil section 17, root 22 and single tooth attachment 23 may be integral with one another.

Returning to FIG. 1, as the engine 10 is increased in size, the nacelle 25 and fan blade assembly 26 will also increase in size. The nacelle 25 serves as an outer housing for the engine 10 and guides air towards the fan blade assembly 26. The fan blade assembly 26 includes a rotor 27 which may include a rotor disk 15 as shown in FIG. 3. The rotor disk 15 includes a plurality of single tooth attachment grooves 24 thereby enabling the rotor disk 15 to be coupled to a plurality of fan blades 16. The nacelle 25 and case 28 define an air bypass passageway 31 through which part of the air propelled by the fan assembly 26 passes and provides thrust for the engine 10. Other air propelled by the fan blade assembly 26 is directed towards the compressor section 12.

Returning to FIGS. 2-3, there is a transition section 32 disposed between the single tooth attachment 23 and the root 22 of the airfoil 17. Applicants have found that there is a substantial stress concentration at the leading edge of a conventional fan blade 16 at the transition section 32 between the single tooth attachment 23 and the root 22 or airfoil 17. For certain conventional fan blades 16, the stress concentration at the transition section 32 may cause the fan blade 16 to fail to meet structural requirements and may be susceptible to cracking or failure in the event of a bird impact. A solution to this problem is illustrated in FIGS. 4-5 and 7-9 below.

Figure 4:
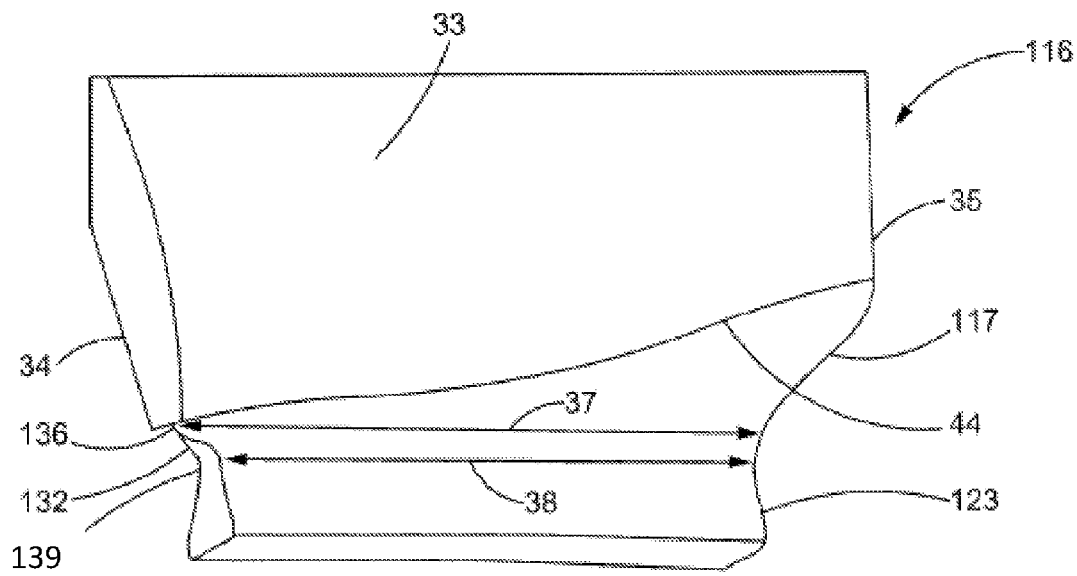
FIG. 4 is a partial perspective view of a disclosed fan blade.
Figure 5:
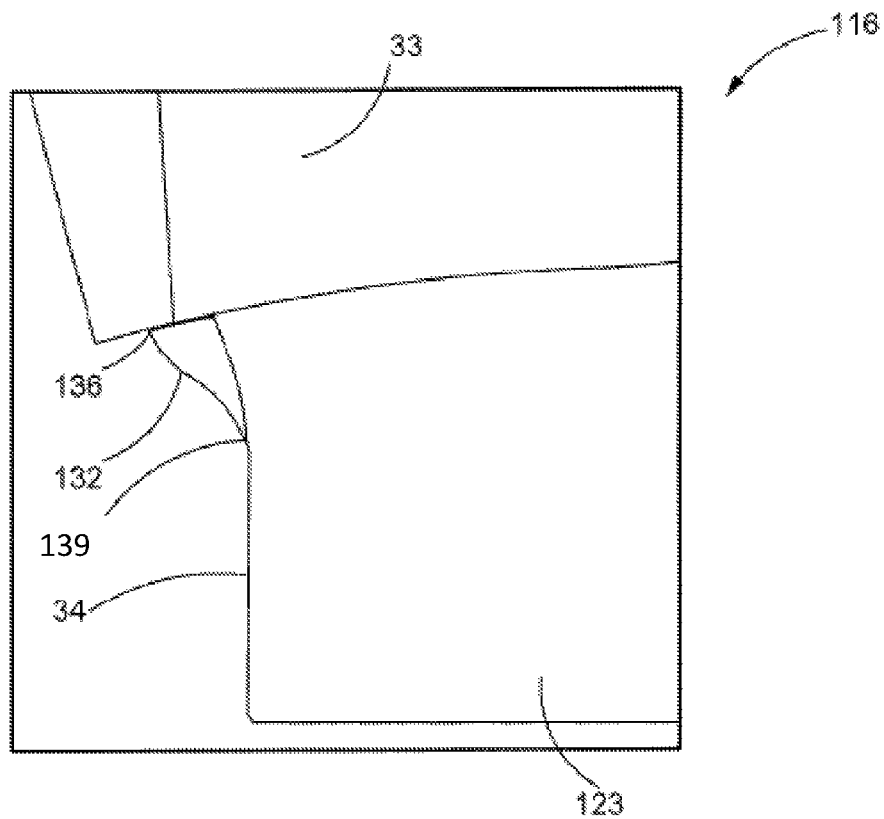
FIG. 5 is an enlarged partial view of the fan blade shown in FIG. 4.

Turning to FIG. 4, a disclosed fan blade 116 includes a single tooth attachment 123 that leads to a transition section 132 that connects the single tooth attachment 123 to the airfoil 117. In the fan blade 116 shown in FIGS. 4-5, the airfoil 117 is covered by a sheath 33. The sheath 33 may be fabricated from titanium or a titanium alloy. The purpose of the sheath 33 is to strengthen the fan blade 116, particularly if the fan blade 116 is fabricated from a light weight material, such as aluminum or an aluminum alloy.

The blade 116 includes a leading edge 34 and a trailing edge 35. As noted above, stress concentration has posed a problem at the transition section 32 between the single tooth attachment 23 and the airfoil 17 (FIGS. 2-3). However, the blade 116 of FIG. 4 includes a unique transition section 132 that extends laterally away from the single tooth attachment 123 before it is connected to the airfoil 117. More specifically, the transition section 132 and single tooth attachment 123 may define a junction 139. Similarly, the transition section 132 and airfoil 117 may also define a junction 136. At the leading edge 34, the transition section 132 extends laterally away from the single tooth attachment 123 before the transition section is connected to the airfoil 117. In other words, the transition section 132 extends laterally forward at the leading edge 34 as the transition section extends from the junction 139 to the junction 136. As a result, the junction 136 defines a first chord 37 while the junction 139 defines a second chord 38. The first chord 37 is longer than the second chord 38 as a result of the transition section 132 extending laterally outward from the junction 139 to the junction 136 or from the single tooth attachment 123 to the airfoil 117. It has been surprisingly found that the increase in chord length or the difference in chord length between the shorter second chord 38 and the longer first chord 37 dramatically reduces the stress concentration experienced at the transition section 132.

Figure 6:
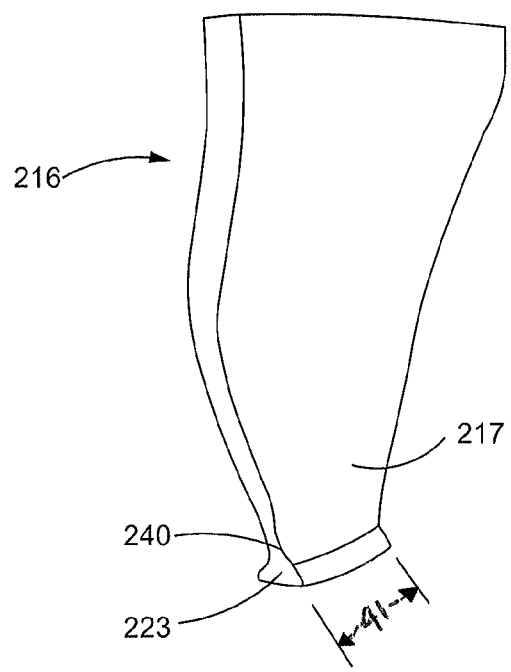
FIG. 6 is a perspective view of a conventional fan blade.
Figure 7:
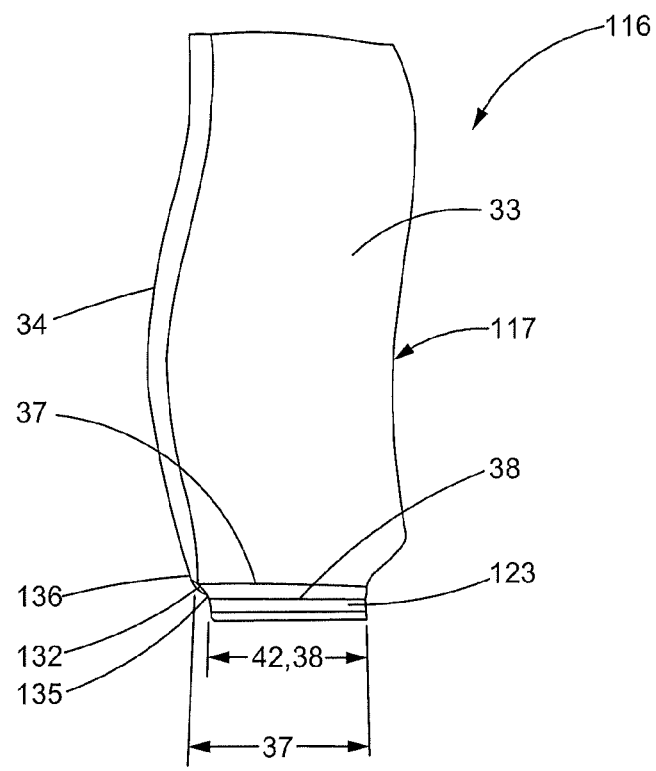
FIG. 7 is a perspective view of a disclosed fan blade.

Specifically, referring to FIGS. 6-7, a conventional fan blade 216 is shown in FIG. 6 with a single tooth attachment 223 that connects to the airfoil 217 in a planar fashion or without a transition section like that shown at 132 in FIGS.

4-5. There is little or no difference between the length of the single tooth attachment 223 and the chord length of the airfoil 217 where the single tooth attachment 223 meets the airfoil 217. The uniform length is shown at 41 in FIG. 6. However, turning to FIG. 7, the single tooth attachment 123 has a length 42 which is at least substantially similar to the second chord length 38 at the junction 139 between the single tooth attachment 123 and the transition section 132. This is in contrast to the first chord length 37 disposed at the junction 136 between the transition section 132 and the airfoil 117. It has been surprisingly found that increasing the chord length from the shorter second chord 38 to the longer first chord 37 at the leading edge 34 of the fan blade 116 dramatically reduces the stress concentration experienced at the transition section 132. Specifically, the stress concentration at the junction 232 of the conventional blade 216 is about 34% higher than the stress concentration experienced at the transition section 132 of the disclosed fan blade 116 when the fan blades 116, 216 are operated under identical operating conditions. Specifically, the stress concentration at the junction 136, where the sheath 33 ends at the leading edge 34 of the fan blade may be about 29 ksi (200 MPa) at normal operating conditions. At the same operating conditions, the stress concentration at the junction 232 of the fan blade 216 may be about 44 ksi (303 MPa). Thus, the transition section 132 provides about a 34% reduction in stress concentration thereby providing a more durable, longer lasting and safer fan blade 116. Still further, it will be noted that the junction 136 is also a lower end point of the sheath 33. The end of the sheath also defines a flow path section 44. Thus, increasing the chord length at the junction 136 where the sheath 33 ends at the leading edge 34 of the fan blade can reduce the stress concentration experienced at the transition section 132 by about 34%, at least in the example shown in FIGS. 6-7. Of course, the stress concentration reduction will vary, depending upon blade size, materials of construction, blade weight or mass, etc.

Figure 8:
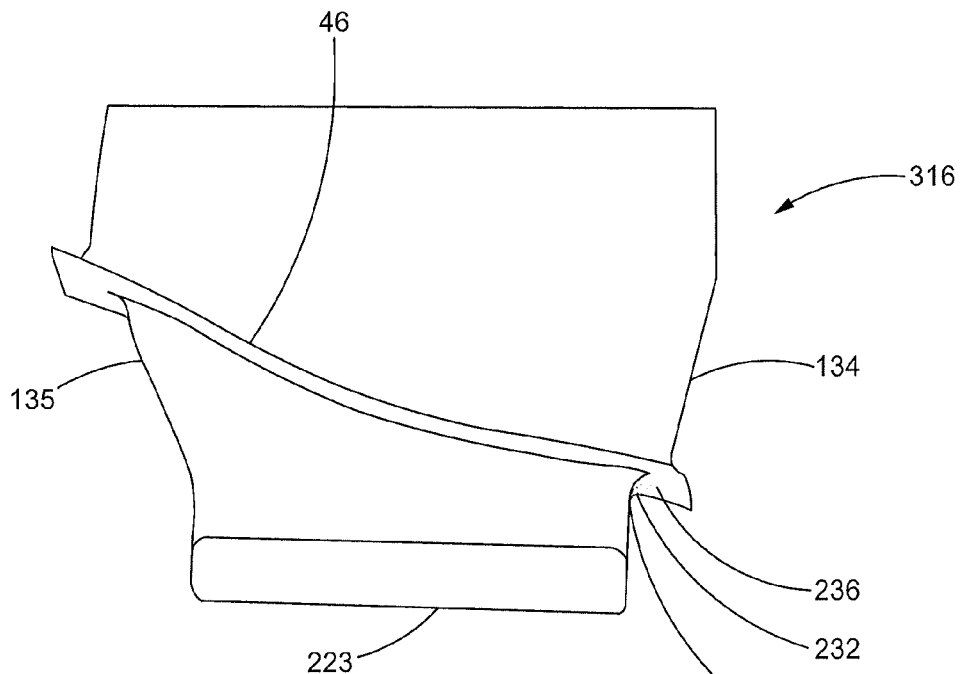
FIG. 8 is a partial perspective view of yet another disclosed fan blade that incorporates the advantages of this disclosure.
Figure 9:
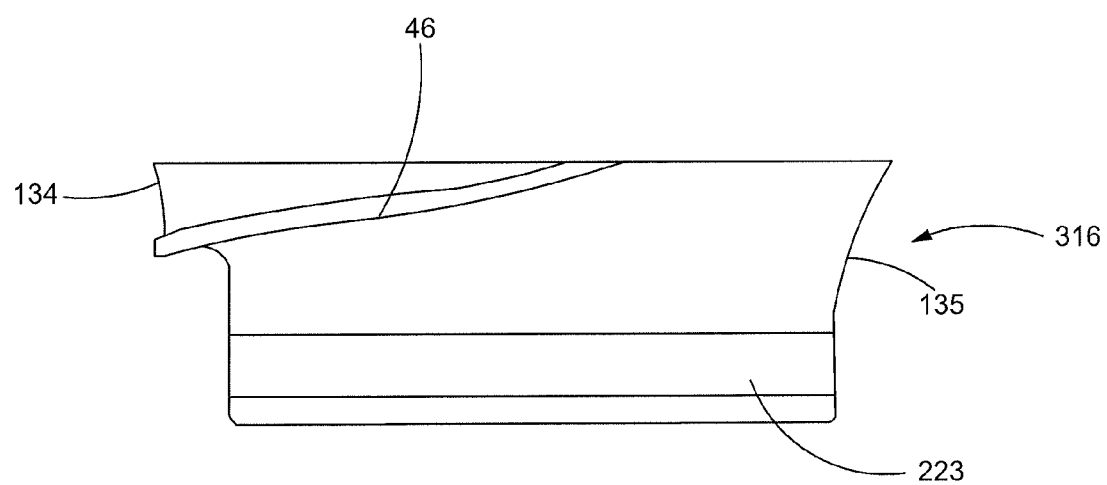
FIG. 9 is a partial and enlarged rear view of the fan blade shown in FIG. 8.

Turning to FIGS. 8-9, the same concept is applied to at different fan blade 316. Turning first to FIG. 8, the fan blade 316 includes a leading edge 134 and a trailing edge 135. The fan blade 316 is also coupled to a rotor disk like that shown at 15 in FIG. 3 via a single tooth attachment 223. At the leading edge 134, below the platform 46, there is a transition section 232 disposed between a first junction 236 and a second junction 239. The transition section 232 curves laterally outwardly from the single tooth attachment 223 thereby increasing the chord length as the transition section 232 extends from the junction 239 to the junction 236. Like the junction 136 shown in FIGS. 4-5, the junction 236 is also at the flow path created by the platform 46. Therefore, it has been surprisingly found that increasing the chord length at the inside flow path causes a reduction in the stress concentration. In the example shown in FIGS. 8-9, the stress concentration at normal operating conditions is about 28 ksi (193 MPa) which is substantially less than the 44 ksi (303 MPa) experienced at the junction 232 of the prior art fan blade 216 (FIG. 6).

INDUSTRIAL APPLICABILITY

The disclosed embodiments provide a reduction in stress concentration at a critical point of a fan blade, particularly fan blades for gas turbine engines. Reducing the stress concentration at or near the transition between the single tooth attachment inner end and the airfoil enables engineers to design fan blades 116, 316 that are lighter than conventional designs. Making the fan blades lighter enables engineers to build fan blade assemblies that are larger to accommodate larger engines which, as noted above, are a preferred means for increasing thrust as opposed to adding additional engines to the aircraft. Thus, light weight fan blades are disclosed that provide the necessary structural requirements and reduce the possibility of damage caused by bird impact.

The invention claimed is:

1. A fan blade comprising:
an airfoil connected to a single tooth attachment;
a transition section extending between a first junction defined by the airfoil and a first end of the transition section and a second junction defined by a second end of the transition section disposed opposite the first end of the transition section and the single tooth attachment, the transition section having a concave profile that extends from the second junction towards a transition point and a convex profile that extends from the transition point towards the first junction;
a first chord extending between the first junction and a trailing edge ofthe single tooth attachment; and
a second chord spaced apart from the first chord, the second chord extending between the second junction and the trailing edge of the single tooth attachment, the first chord being longer than the second chord.

2. The fan blade of claim 1 wherein the airfoil is at least substantially covered by a sheath.

3. The fan blade of claim 2 wherein the sheath does not cover the transition section.

4. The fan blade of claim 2 wherein the sheath is fabricated from at least one of titanium and a titanium alloy.

5. The fan blade of claim 2, wherein the sheath defines a flow path section extending along an arcuate path from the first junction towards a trailing edge of the airfoil.

6. A gas turbine engine comprising:
a fan blade assembly including a rotor disk having an outer periphery, the outer periphery of the rotor disk including a plurality of single tooth attachment slots;
a plurality of fan blades, each fan blade including an airfoil connected to a single tooth attachment, each single tooth attachment slot of the rotor disk accommodating the single tooth attachment of one of the fan blades;
for each fan blade, the airfoil, the single tooth attachment, and a transition section extending between the airfoil and the single tooth attachment including leading and trailing edges;
for each fan blade, the transition section defining a first chord at a junction between the transition section and the airfoil, for each fan blade, the transition section defining a second chord at a junction between the transition section and the single tooth attachment;
wherein for each fan blade, the transition section extends laterally outward away from the single tooth attachment from the junction between the transition section and the single tooth attachment before reaching the junction between the transition section and the airfoil, the transition section having a concave profile and a convex profile that extends from the concave profile, and a discontinuity between the transition section and a leading edge of the fan blade.

7. The engine of claim 6 wherein, for each fan blade, the trailing edge of its airfoil, transition section and single tooth attachment are at least substantially coplanar.

8. The engine of claim 6 wherein each airfoil of each fan blade is at least substantially covered by a sheath.

9. The engine of claim 8 wherein each sheath does not cover the transition section of its fan blade.

10. The engine of claim 8 wherein each sheath is fabricated from a material selected from the group consisting of titanium and a titanium alloy.

11. The engine of claim 6 wherein, for each fan blade, the leading edge of the transition section curves as said leading edge extends from the junction of said transition section and single tooth attachment of said fan blade to the junction of said transition section and airfoil of said fan blade.

12. The engine of claim 6 wherein, for each fan blade, the junction of the transition section and the airfoil has a first thickness and the junction of the transition section and the single tooth attachment has a second thickness, and wherein for each fan blade, the second thickness is greater than the first thickness.

\* \* \* \* \*